United States Patent
Qiu et al.

(10) Patent No.: US 9,985,958 B2
(45) Date of Patent: May 29, 2018

(54) SEGMENTATION, HANDSHAKING, AND ACCESS CONTROL SOLUTIONS FOR OPENDOTS TECHNOLOGY

(71) Applicant: Intel Corporation, Santa Clara, CA (US)

(72) Inventors: Bo Qiu, Hillsboro, OR (US); Jianfang Zhu, Hillsboro, OR (US); Anand S. Konanur, Sunnyvale, CA (US); Bradley A. Jackson, Santa Clara, CA (US); Sayan Lahiri, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 15/081,883

(22) Filed: Mar. 26, 2016

(65) Prior Publication Data
US 2017/0201105 A1  Jul. 13, 2017

Related U.S. Application Data

(60) Provisional application No. 62/387,446, filed on Dec. 26, 2015.

(51) Int. Cl.
*H02J 7/00* (2006.01)
*H04L 29/06* (2006.01)
*H04W 12/06* (2009.01)

(52) U.S. Cl.
CPC .......... *H04L 63/083* (2013.01); *H04W 12/06* (2013.01)

(58) Field of Classification Search
CPC ...... H02J 7/0042; H04W 12/06; H04L 63/083

USPC ......................................................... 320/114
See application file for complete search history.

(56) References Cited

U.S. PATENT DOCUMENTS

| | | | | |
|---|---|---|---|---|
| 5,764,518 A | * | 6/1998 | Collins .................. | B25J 9/1617 700/117 |
| 8,901,778 B2 | * | 12/2014 | Kesler et al. ............ | H03H 7/40 307/104 |
| 8,922,066 B2 | * | 12/2014 | Kesler et al. ........ | B60L 11/1812 307/104 |
| 8,933,594 B2 | * | 1/2015 | Kurs et al. .............. | B60L 3/003 307/104 |
| 8,957,549 B2 | * | 2/2015 | Kesler et al. ............ | H03H 7/40 307/104 |

(Continued)

*Primary Examiner* — Sun Lin
(74) *Attorney, Agent, or Firm* — Schwabe, Williamson & Wyatt, P.C.

(57) ABSTRACT

Apparatus, methods, and systems described herein are for segmentation, handshaking, and access control solutions for Opendots technology. One embodiment described a charging pad that includes a plurality of conductive strips, switches, and decipher circuitry. A switch is coupled to the plurality of conductive strips whereas the decipher circuitry is coupled to the plurality of conductive strips and the switch. In response to contact with one conductive strip of the plurality of conductive strips, the decipher circuitry determines whether a security password has been received. The switch allows a voltage higher than a threshold voltage level to be supplied to an external device if the security password is received by the decipher circuitry. However, the switch can also prevent a voltage higher than a threshold voltage level to be supplied to an external device if the security password is not received by the decipher circuitry.

20 Claims, 4 Drawing Sheets

(56) References Cited

U.S. PATENT DOCUMENTS

2012/0248888 A1* 10/2012 Kesler et al. ............ H03H 7/40
307/104

* cited by examiner

SEGMENTATION, HANDSHAKING, AND ACCESS CONTROL SOLUTIONS FOR OPENDOTS TECHNOLOGY

CROSS-REFERENCE TO RELATED APPLICATIONS

This application claims the benefit of U.S. Provisional Application No. 62/387,446 filed Dec. 26, 2015.

FIELD

This disclosure pertains to wireless device charging, and in particular (but not exclusively) to techniques for providing access control techniques for Opendots wireless charging solutions.

BACKGROUND

An Opendots-compatible charging pad features exposed long-metal conductor pieces running 15-19V of voltage. Unfortunately, charging pads of this type are prone to electric shorts which facilitates injuries during human contact. To prevent electric shorts and injury, circuit breakers are commonly implemented to shut off the entire charging pad when an excessive amount of electric current is detected. As such, each electric short can trigger a global power outage for each device that is in contact with the charging pad.

A need for a solution exists to control a global power outage when a short is detected. Furthermore, a solution is needed to prevent electric current from flowing through a human body when there is contact with a charging pad. The present disclosure addresses these needs.

BRIEF DESCRIPTION OF DRAWINGS

To facilitate understanding, identical reference numerals have been used, where possible, to designate identical elements that are common to the drawings. The drawings are not to scale and the relative dimensions of various elements in the drawings are depicted schematically and not necessarily to scale. The techniques of the present disclosure may readily be understood by considering the following detailed description in conjunction with the accompanying drawing, in which.

DETAILED DESCRIPTION

The description of the different advantageous embodiments has been presented for purposes of illustration, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Apparatus, methods, and systems are herein described for segmentation, handshaking, and access control solutions for Opendots technology. The present disclosure provides a charging pad that includes a plurality of conductive strips, switches, and decipher circuitry. A switch may be coupled to the conductive strips whereas the decipher circuitry may be coupled to the conductive strips and the switch. In response to contact with one of the conductive strips, the decipher circuitry determines whether a security password has been received. The switch allows a voltage higher than a threshold voltage level to be supplied to an external device if the security password is received by the decipher circuitry. However, the switch may also prevent a voltage higher than a threshold voltage level to be supplied to an external device if the security password is not received by the decipher circuitry.

Figure 1:
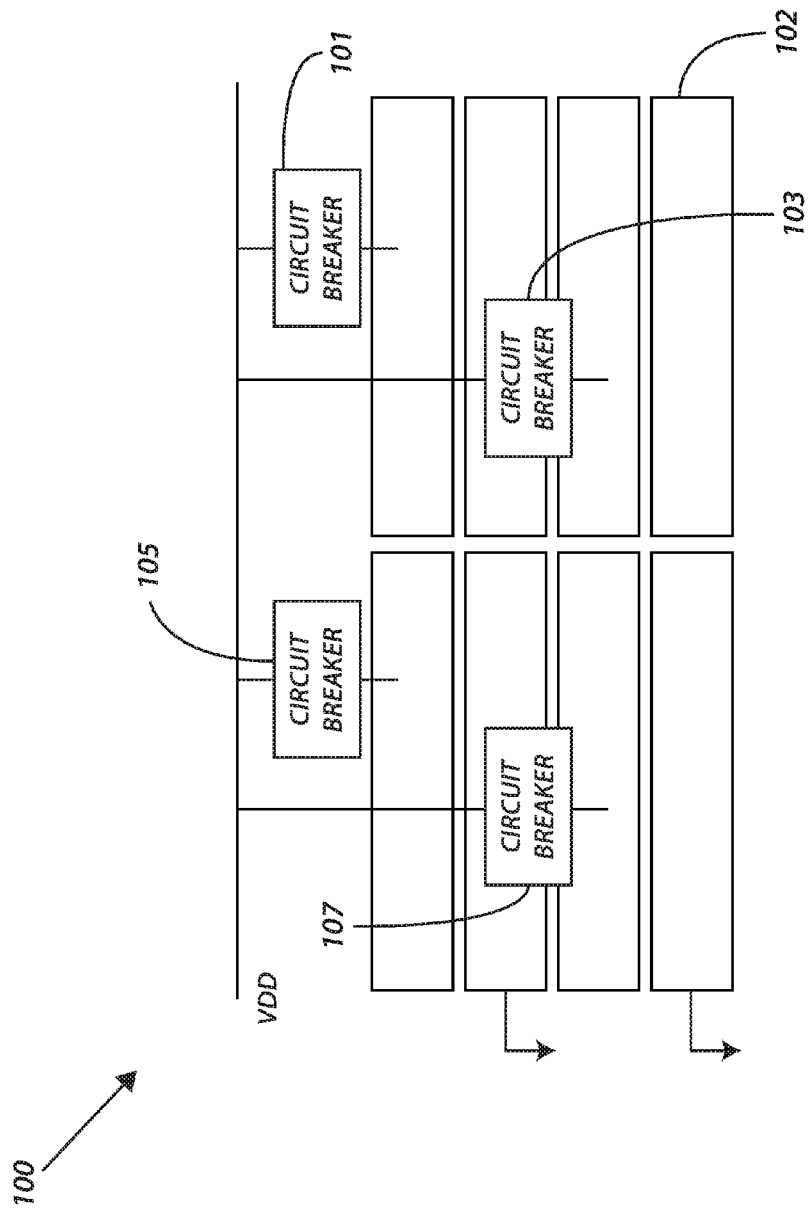
FIG. 1 depicts the segmentation of metal strips and individual circuit breakers on an Opendots-compatible charging pad.

FIG. 1 depicts the segmentation of metal strips 102 and individual circuit breakers 101, 103, 105, 107 on an Opendots-compatible charging pad 100. In the embodiment shown, the metal strips 102 are electrically insulated from each other. Accordingly, whenever there is an electric short, only the affected segments will experience a power outage while the remaining segments remain functional such that most of the devices being charged will be unaffected. As such, the present disclosure provides an Opendots platform which is robust in that the charging pad may continue to function even in the event of a short or other electrical fault.

It should be understood by one having ordinary skill in the art that at least one of the metal strips 102 is grounded whereas at least one of the metal strips 102 is coupled to a power source (e.g., positive voltage). Accordingly, the metal strips 102 may be grounded or coupled to positive or negative voltage sources.

Moreover, the Opendots-compatible charging pad 100 may contain at least two metal strips 102. In the embodiment shown in FIG. 1, pad 100 contains eight metal strips 102. Four of the metal strips 102 are each connected to circuit breakers 101, 103, 105, 107 whereas the four other metal strips 102 are connected to ground.

Figure 2:
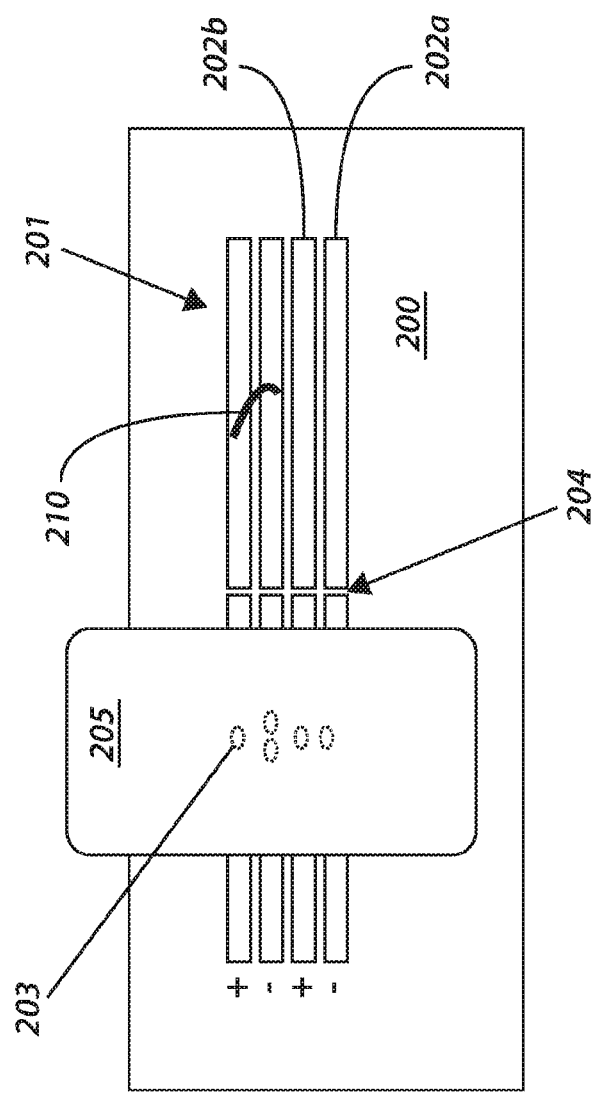
FIG. 2 is an illustration of a manner of which the metal strips are affected as a result of an electric short.

FIG. 2 is an illustration of a manner of which the metal strips 202a, 202b are affected as a result of an electric short 210. Particularly, FIG. 2 depicts an Opendots-compatible charging pad 201, disposed on a table 200, with an electronic device 205 thereupon. Electronic device 205 may be a mobile phone (e.g., a smartphone), laptop, 2:1 device, tablet or the like. It should be understood by one having ordinary skill in the art that Opendots-compatible charging pad 201 is connected to a power source (e.g., external power source) that is not shown in the figure.

Metal strips 202a, 202b may be positively-charged metal strips 202b or negatively-charged. In operation, electrical contacts 203 disposed on the backside of electronic device 205 make contact with the metal strips 202a, 202b. By doing so, electronic device 205 is electrically coupled to the Opendots-compatible charging pad 201 to receive power and communications therefrom. Moreover, electronic device 205 can also pass communications to the Opendots-compatible charging pad 201 such as security credentials, a device type, and a unique code associated with the electronic device. In addition, electronic device 205 may communicate whether the electronic device 205 has Wi-Fi capability or whether the device 205 can be docked.

It should be understood by one having ordinary skill in the art that the device identifier bit code transmitted to the Opendots-compatible charging pad 201 may comprise more or less information than what has been previously described. The device identifier bit code may be 4, 6, 8, 16 or 32 bits or more. However, the present disclosure is not necessarily limited thereto.

Figure 3A:
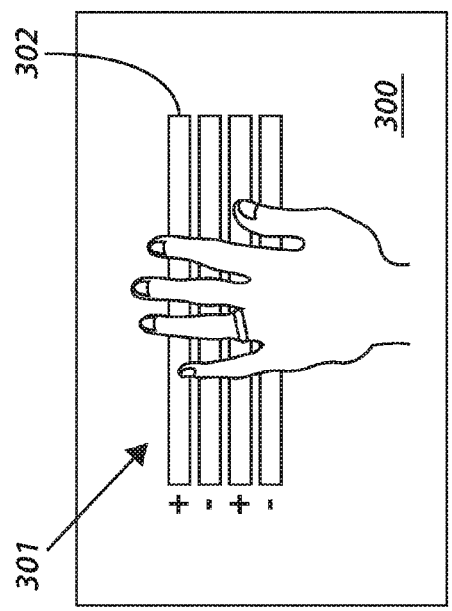
FIGS. 3A-3B is an illustration depicting that the charging pad can detect valid and invalid external devices thereon.
Figure 3B:
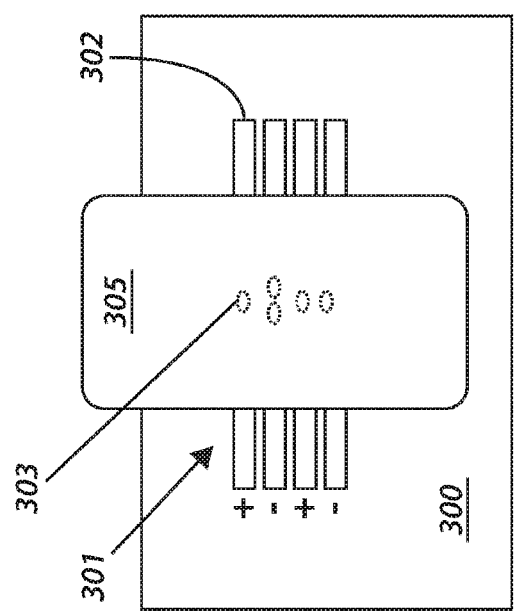

FIGS. 3A-3B is an illustration depicting that the charging pad 301 can detect valid and invalid external devices thereon. In the figures, an electronic device 305 such as a smartphone device is in contact with Opendots-compatible charging pad 301, via electrical contacts 303 on the backside of the smartphone device 305, both disposed on a table 300. As described above, Opendots-compatible charging pad 301 comprises a plurality of metal strips 302 that are positively or negatively charged (or converted to ground).

In one or more embodiments, the Opendots-compatible charging pad 301 and the electronic device 305 can communicate with each other. For example, when the electronic device 305 is placed upon the Opendots-compatible charging pad 301, the charging pad 301 may sense or the electronic device 305 may transmit a device identifier. As shown in FIG. 3A, electronic device 305 is electrically coupled to Opendots-compatible charging pad 301 to receive a credential such as a security password. As will be described in more detail below, if the security check is a pass, a pre-set voltage level is supplied from the Opendots-compatible charging pad 301 to the electronic device 305.

In contrast, as in the case depicted in FIG. 3B, if the credential is not received by the Opendots-compatible charging pad or there is a non-response and the security check fails, no electronic current or voltage is supplied to the electronic device 305.

In the example shown, a human hand is placed on the metal strips 302 of the Opendots-compatible charging pad 301. Since a bare human hand can not pass credentials to or be sensed therefrom, the pre-set voltage level (e.g., high voltage) is not supplied from the Opendots-compatible charging pad 301. Accordingly, Opendots-compatible charging pad 301 is a "smart device" in that it can prevent injuries due to electrical shocks, etc. It should be understood, however, that the bare hand depicted in FIG. 3B is only exemplary and that the placement of other items (e.g., books, paper, etc.) may also result in a security failure to prevent injuries.

Figure 4:
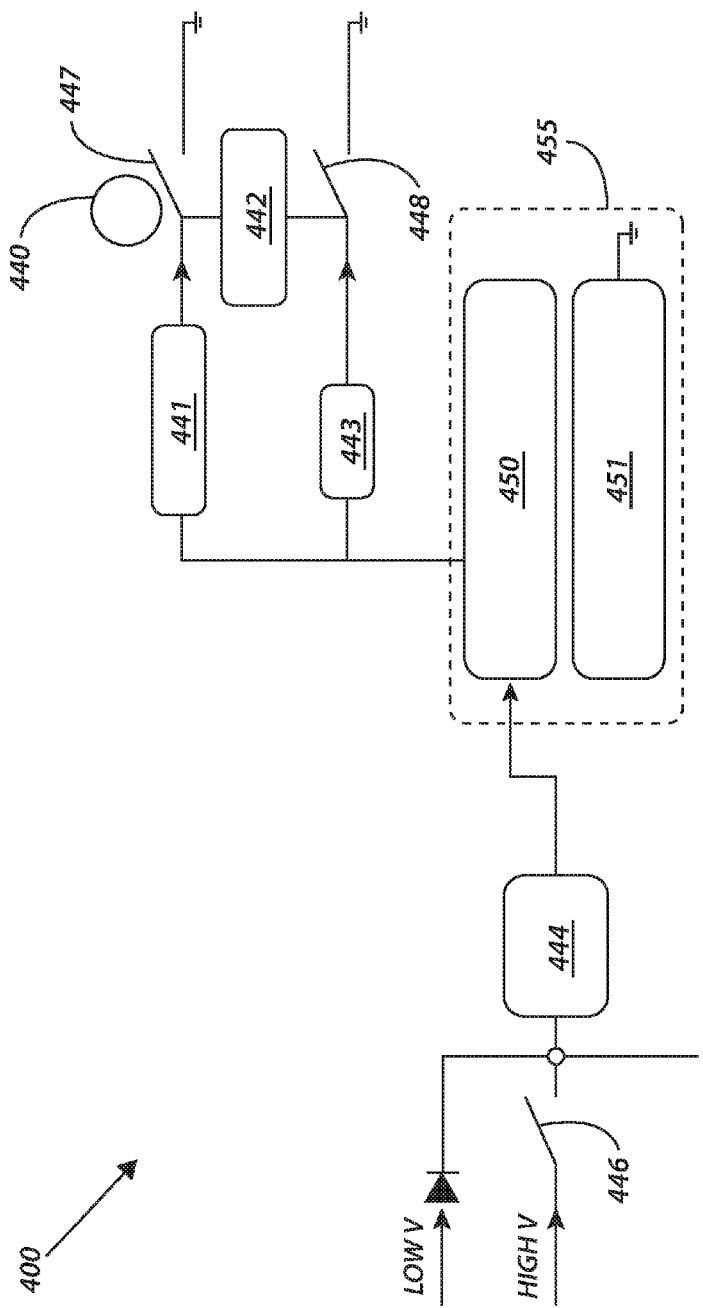
FIG. 4 is an illustration depicting a circuit layout of an Opendots-compatible system.

FIG. 4 is an illustration depicting a circuit layout 400 of an Opendots-compatible system. An external device 440 such as an electronic device or gadget may be placed on the metal strips 450, 451 of an Opendots-compatible charging pad 455. In the embodiment shown, Opendots-compatible charging pad 455 is not limited to two metal strips 450, 451 but may include more. In addition, the metal strips 450, 451 may be segmented, as described above, such that the decipher circuitry within the Opendots-compatible charging pad 455 is shown above metal strip 450.

In the event that an external device 440 is placed on the Opendots-compatible charging pad 455, a resistive switch 447 is engaged. Once resistive switch 447 is engaged, in some embodiments, a resistance is read (block 441) by a processing device 442. In some implementations, processing device 442 is a microcontroller 442.

In some implementations, microcontroller 442 has a unique tag with a set of bit values. These bit values are compared to the bit pattern associated with an external device 440 as will be described below. The bit values associated with the unique tag of the Opendots-compatible charging pad 455 may identify a device type, a unique code associated with the Opendots-compatible charging pad 455, whether the Opendots-compatible charging pad 455 has Wi-Fi capability, and whether the Opendots-compatible charging pad 455 has docking capability.

Most notably, microcontroller 442 also controls switch 448 and senses the bit pattern associated with the device identifier. During this "handshaking process", the Opendots-compatible charging pad 455 can determine if the external device 440 is a valid and acceptable device that is compatible with the Opendots-compatible charging pad 455.

Opendots-compatible charging pad 455 may further comprise a current sensor 444 that measures the current when switch 447 is closed to aid in determining the bit code associated with the device identifier of the external device 440. Microcontroller 442 controls resistance switch 447 which opens and closes swiftly to help determine the bit pattern associated with the external device 440.

It should be noted that during the handshaking process, the active low voltage signal is on such that the microcontroller 442 can read the device identifier, if any, from the external device 440. In some embodiments, the active low voltage source remains on after the handshaking process. In this embodiment, the voltage provided is sufficiently low such that injuries do not result if humans, animals, etc. come into contact with the Opendots-compatible charging pad 455.

In the event that external device 440 passes the security check (e.g., has the correct credentials), the microcontroller 442 closes high-voltage switch 446 such that the high-voltage source can be provided to the Opendots-compatible charging pad 455. In some instances, when switch 448 is closed, Opendots-compatible charging pad 455 has access to the high-voltage source and allows the charging of the external device (i.e., smartphone, laptop, etc.).

Moreover, when the high-voltage switch 446 is closed, the current associated therewith passes through the current sensor 442 to the metal strips 450 and to the load block 443 which is associated with the electronic device 440. As such, once the security check is complete and the electronic device 440 has been validated (e.g., for proper use with the charging pad 455), the microcontroller 442 closes the resistance switch 441, load switch 443 and high voltage switch 446.

It should be understood by one having ordinary skill in the art that when the microcontroller 442 senses the device identifier associated with the external device 440, the microcontroller 442 will determine which capabilities the Opendots-compatible charging pad 455 will provide for the external device 440 after the microcontroller 442 compares the bit pattern associated with the device identifier of the external device 440 with the bit values associated with the Opendots-compatible charging pad 455.

In some implementations of the present disclosure, the low voltage source provides less than 1V. For example, in some embodiments, the low voltage source in the circuit layout of FIG. 4 provides a voltage source of 500 mV. Alternatively, the high voltage source may be a dynamic power supply and provides a voltage source between 3.5V and 20V in some embodiments.

The present disclosure is effective as it is device independent being that it provides a solution for both a smartphone and laptop device. Furthermore, there is no need for an additional signal reader and which provides a cost-effective solution. The present disclosure is further advantageous as the Opendots-compatible system described does not cause radiation.

Alternatively, in some embodiments, the Opendots-compatible system may employ near field communications (NFC) technology to perform "handshaking" between the charging pad and external device.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The invention claimed is:

1. A charging pad, comprising:
a plurality of conductive strips to transfer power to an external device; and
a plurality of circuit breakers coupled to the plurality of conductive strips, wherein the plurality of circuit breakers are segmented into at least two segments.

2. The charging pad of claim 1, wherein each segment of the at least two segments includes at least one positively-charged metal strip and at least one negatively-charged metal strip.

3. The charging pad of claim 1, wherein each conductive strip of the plurality of conductive strips is insulated from the other conductive strips.

4. The charging pad of claim 1, wherein the plurality of conductive strips consist of positively-charged conductive strips and negatively-charged conductive strips.

5. The charging pad of claim 1, wherein in an event that one conductive strip of the plurality of conductive strips is non-functional, the non-functional conductive strip does not affect a functionality of a other conductive strips.

6. A charging pad, comprising:
a plurality of conductive strips,
a switch coupled to the plurality of conductive strips; and
decipher circuitry coupled to the conductive strips and the switch,
wherein in response to contacting one conductive strip of the plurality of conductive strips, the decipher circuitry determines whether a security credential has been received,
wherein the switch allows a voltage higher than a threshold voltage level to be supplied to an external device if the security credential is received by the decipher circuitry,
wherein the switch prevents a voltage higher than the threshold voltage level from being supplied to the external device if the security credential is not received by the decipher circuitry.

7. The charging pad of claim 6, wherein the decipher circuitry is to continuously propagate a signal to the external device in contact with the plurality of conductive strips to request the security credential.

8. The charging pad of claim 6, wherein the switch is normally engaged to prevent a higher voltage to be supplied to the external device.

9. The charging pad of claim 6, wherein the plurality of conductive strips consist of at least one conductive strip that is in contact with a voltage source and at least another one conductive strip that is in contact with a ground terminal.

10. A system, comprising:
a charging pad, comprising:
a plurality of conductive strips to transfer power to an electronic device;
a plurality of circuit breakers coupled to the plurality of conductive strips,
wherein the plurality of circuit breakers are segmented into at least two segments; and
a processing device to detect a device identifier associated with the electronic device;
wherein the electronic device is coupled with at least one conductive strip of the plurality of conductive strips.

11. The system of claim 10 further comprising a power source to provide power to the charging pad.

12. The system of claim 11, wherein the power source includes a low voltage source and a high voltage source.

13. The system of claim 10, wherein the processing device is a microcontroller.

14. The system of claim 10, wherein the device identifier identifies a device type, a unique code associated with the electronic device, whether the electronic device needs Wi-Fi capability, and whether the electronic device can be docked.

15. The system of claim 10, wherein the charging pad further comprises a switch coupled to the plurality of conductive strips wherein the switch allows a voltage higher than a threshold voltage level to be supplied to an external device if a security credential is received by decipher circuitry, wherein the switch prevents a voltage higher than the threshold voltage level to be supplied to the external device if the security credential is not received by the decipher circuitry.

16. The system of claim 10, wherein the plurality of circuit breakers are segmented into eight segments.

17. The system of claim 10, wherein the charging pad is Opendots compatible.

18. The system of claim 10, wherein the electronic device is at least one of a mobile phone, smartphone device, laptop device, tablet, or 2:1 device.

19. The system of claim 10, wherein the electronic device further comprises a set of contacts on a side of the electronic device in contact with the at least one of the plurality of conductive strips.

20. The system of claim 19, wherein the set of contacts comprises a plurality of metal balls.

* * * * *

UNITED STATES PATENT AND TRADEMARK OFFICE
CERTIFICATE OF CORRECTION

PATENT NO. : 9,985,958 B2
APPLICATION NO. : 15/081883
DATED : May 29, 2018
INVENTOR(S) : Bo Qiu et al.

Page 1 of 1

It is certified that error appears in the above-identified patent and that said Letters Patent is hereby corrected as shown below:

In the Specification

Column 5
Line 35, "...of a other..." should read – ...of the other... –

Signed and Sealed this
Thirty-first Day of July, 2018

Andrei Iancu
*Director of the United States Patent and Trademark Office*